Sept. 20, 1960     B. F. WALDRON     2,953,222
ONE-WAY HYDRAULIC BRAKE
Filed Aug. 1, 1957                    3 Sheets-Sheet 1
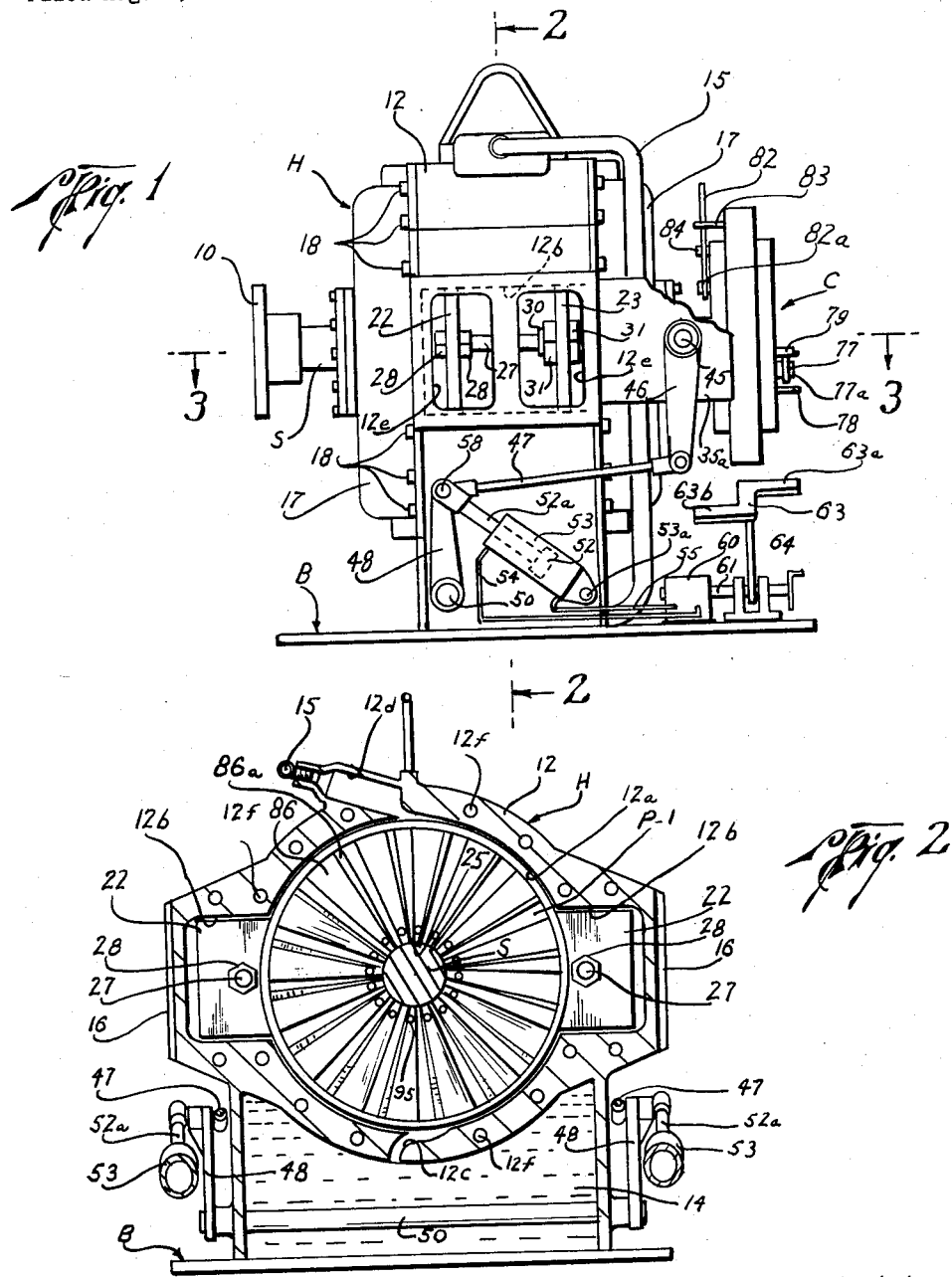
Benjamin F. Waldron
INVENTOR.
BY Hayden & Pravel
ATTORNEYS

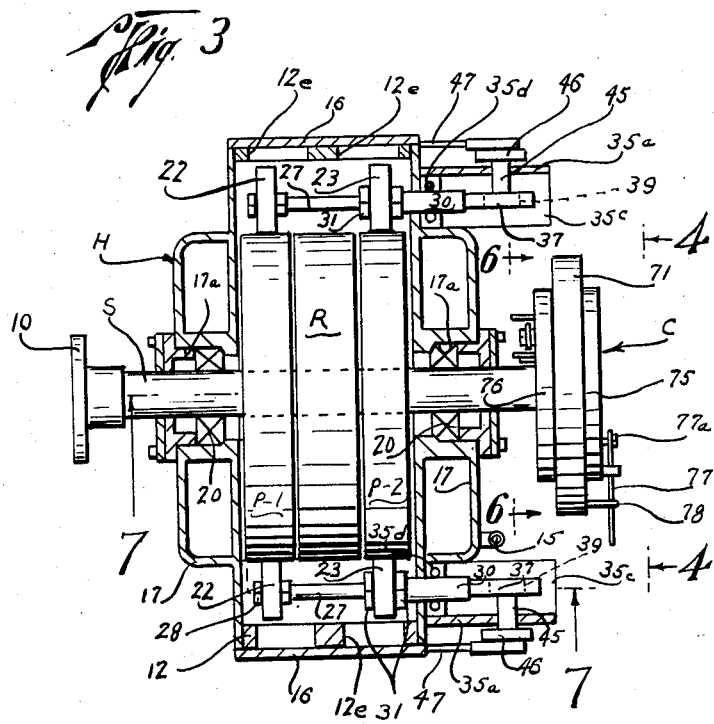
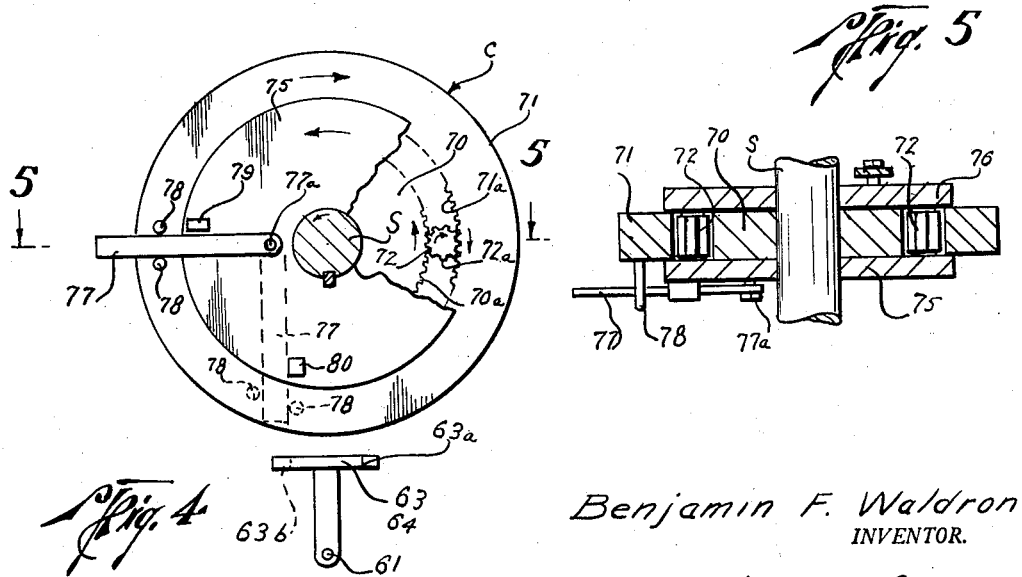
Benjamin F. Waldron
INVENTOR.

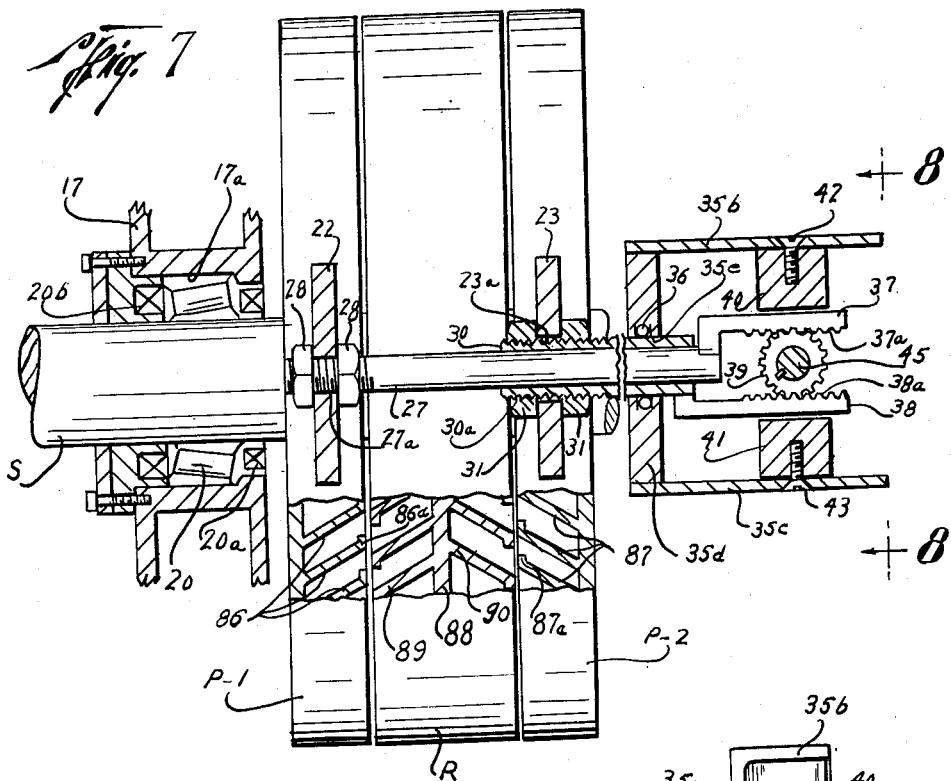

United States Patent Office 2,953,222
Patented Sept. 20, 1960

2,953,222

ONE-WAY HYDRAULIC BRAKE

Benjamin F. Waldron, Corpus Christi, Tex.
(4518 Dewberry St., Houston 21, Tex.)

Filed Aug. 1, 1957, Ser. No. 675,751

3 Claims. (Cl. 188—90)

This invention relates to drag devices, and particularly to devices for applying a dragging or braking effect to a drum shaft to limit the rate at which a cable or line is unwound from the drum on the drum shaft.

As is well known, well pipe such as drill pipe is lowered and raised in a well during the drilling of the well and during other operations in connection therewith. The well pipe is normally suspended from a cable or line in a well derrick as the pipe is raised or lowered in the well, and the cable or line is usually wound on a drum of a drawworks. As the cable or line is unwound from the drum, the pipe is lowered in the well and as the cable or line is wound up on the drum, the pipe is raised in the well. Heretofore, drag brakes have been utilized for retarding or limiting the unwinding of the cable or line from the drum of the drawworks, but so far as is known, all of the drag brakes heretofore used have required an overriding clutch or a manual clutch on the drum shaft between the drum of the drawworks and the drag brake. Numerous difficulties have been experienced with the use of such prior known drag brakes which require the clutches, largely because of the sudden and tremendous loads which are often applied to the drum shaft when the clutch is engaged. For example, it is not uncommon for drum shafts to snap in two when the clutches to the drag brakes are engaged. Also, the clutch or the drag brake is often damaged when the clutch is engaged.

It is one object of this invention to provide a new and improved drag device or brake which is especially suitable for mounting on a drum shaft and which is so constructed that the use of a clutch therewith is not required.

An important object of this invention is to provide a new and improved drag device or brake for applying dragging or braking action on a shaft to which the device or brake is connected, wherein the device or brake employs fluid as the medium for obtaining the dragging or braking action, and wherein the device or brake is constructed so that shock loads on the shaft are at a minimum when the dragging or braking action is applied to the shaft.

Another object of this invention is to provide a new and improved drag device or brake for connection with a shaft, wherein the device or brake is constructed so that a dragging or braking force is initially applied to the shaft to gradually limit the rotation of the shaft until a constant dragging or braking force is applied to the shaft.

Still another object of this invention is to provide a new and improved drag device or brake which has means therewith for automatically shifting the device or brake from a dragging or braking position to a released position, and vice versa, in accordance with the direction of rotation of a shaft connected with the device or brake.

A further object of this invention is to provide a new and improved drag device or brake which is cooled by a circulation of oil effected by the drag device or brake itself, whereby a separate cooling pump is unnecessary.

A particular object of this invention is to provide a new and improved drag device or brake for connection with the shaft of a drum in a drawworks for applying a dragging or braking force to a cable on the drum as the cable is unwound from the drum, such device or brake having means therewith for releasing the dragging or braking action on the cable when the cable is being wound up on the drum.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

Fig. 1 is an elevation of the drag device or brake of this invention;

Fig. 2 is a sectional view taken on line 2—2 of Fig. 1 to further illustrate the drag device or brake of this invention;

Fig. 3 is a horizontal sectional view taken on line 3—3 of Fig. 1, with portions thereof illustrated in plan, to still further illustrate the drag device or brake of this invention;

Fig. 4 is an end view taken on line 4—4 of Fig. 3 and it particularly illustrates the construction of the reversing or actuating means of the device of this invention;

Fig. 5 is a sectional view taken on line 5—5 of Fig. 4;

Fig. 6 is an end view taken on line 6—6 of Fig. 3 and it illustrates the reversing or actuating means of Fig. 4 from the opposite side thereof;

Fig. 7 is an enlarged view, partly in elevation and partly in section, illustrating the internal portion of the drag device or brake of this invention, taken on line 7—7 of Fig. 3; and Fig. 3 is an end view taken on line 8—8 of Fig. 7.

In the drawings, the letter H designates generally the housing of the drag device or brake of this invention. The housing H is preferably mounted on a base B which is adapted to be positioned on the ground or any suitable support or foundation (not shown). A stub shaft S extends through the housing H in a manner to be hereinafter described, and such stub shaft S has a connector flange 10 or any other suitable connecting means so that such stub shaft S can be connected with a shaft extending from the drum of a drawworks used in connection with an oil rig. The connector 10 can actually serve to connect the stub shaft S to other shafts, but as will be explained more in detail, the drag device or brake of this invention is particularly suitable in connection with the shaft of a drum mounted with a drawworks. A rotor R is mounted on the shaft S for rotation therewith, but the rotor R is not movable longitudinally with respect to the shaft S. Drag plates P-1 and P-2 are positioned on the opposite sides of the rotor R and, as will be explained in detail, such plates P-1 and P-2 are prevented from rotating with the shaft S, but they are movable towards and away from each other and the rotor R so as to regulate or control the extent of the dragging or braking action obtained with the device of this invention. The movement of the plates P-1 and P-2 with respect to each other and the rotor R is controlled in the normal use of the device of this invention by a control or operating means C, the details of which will be explained hereinafter. The control or operating device C changes the position of the plates P-1 and P-2 with respect to the rotor R when the stub shaft S is changed in its direction of rotation so that a maximum dragging or braking force is applied to the shaft S when the shaft S is rotated in one direction and so that substantially no drag or braking force is applied to the stub shaft S when the shaft S rotates in the other direction. Therefore, when the drag device or brake of this invention is used in connection with a drum shaft of a drawworks, a drag or braking force is imparted to the cable on the drawworks drum as the cable is unwound from the drum for the lowering of well pipe into a well, but upon the winding of the cable on the drum for the raising of well pipe in the well, the drag on the drum shaft is eliminated. Also, as will be more evident hereinafter, such operation is automatic with the device of this invention and it is accomplished without the use of an intermediate clutch between the stub shaft S and the shaft of the drawworks drum. Other features of the invention will also appear hereinafter.

Considering the invention in detail, the housing H may be formed in numerous ways, but as illustrated in the drawings, such housing H includes a central housing section 12 which is formed with a substantially cylindrical inner bore or surface 12a, the inner diameter of which corresponds substantially with the external diameter of the rotor R and the drag plates P-1 and P-2 (Fig. 2). Since the rotor R rotates relative to the housing H, there is a clearance around the external surface of the rotor R so that it does not contact the internal surface 12a of the central housing section 12 during the rotation of the rotor R. Each side of the central housing section 12 is formed with substantially rectangular guide channels 12b which serve to guide the movement of the drag plates P-1 and P-2 towards and away from each other as will be explained hereinafter.

The central housing section 12 is provided with a lower inlet opening 12c and an upper outlet opening 12d. The opening 12c establishes fluid communication between a fluid or liquid reservoir 14 which is formed below the central housing section 12 and is preferably an integral part therewith with the base B forming the lower portion thereof. A liquid such as an oil is preferably confined within the reservoir 14 and as the rotor R is rotated, the liquid is caused to flow into the central housing section 12, as will be more evident hereinafter. The flow through the opening 12c is from the reservoir 14 to the internal area of the housing section 12 when the rotor R is rotating in one direction and at that time, the fluid is also discharged from the opening 12d at the upper end of the housing section 12 to return to the fluid reservoir 14 through any suitable tube or pipe 15 (Figs. 1-3). However, as will be explained, when the rotor R is rotating in the other direction, the fluid or liquid is pumped in the opposite direction so that it is discharged from the central housing section 12 through the opening 12c into the reservoir 14 and is admitted to the housing section 12 through the opening 12d, but in any event, the rotor R serves as the pumping member and the liquid circulation is maintained at all times.

At the sides of the central housing section 12 adjacent to each of the guide-ways 12b, access openings 12e (Fig. 1) are provided, but during the use of the drag device of this invention, such openings 12e are closed with a cover plate 16 (Fig. 2) to prevent the escape of the oil or other liquid used within the device. The plates 16 are shown as removed in Fig. 1 for purposes of illustration, but they would of course be connected during operation with any suitable connecting means such as bolts (not shown).

The housing H also includes end caps 17 on each of the ends of the central housing section 12, and each of such caps 17 is secured to the central housing section 12 with suitable bolts 18 or other suitable securing means which extend through openings 12f provided in the central housing section 12 (Fig. 2). Each of the caps 17 is formed with a substantially central opening 17a therethrough for receiving a bearing 20, the details of which are illustrated in Fig. 7. Such bearing 20 may of course be formed in numerous ways, and it is positioned with the cap 17 for supporting the stub shaft S extending therethrough. The bearing of course has adequate seals 20a and 20b therewith for preventing the fluid in the interior of the housing section 12 from passing outwardly along the shaft S. It will be understood of course that the bearing 20 for the right-hand end of the stub shaft S as viewed in Fig. 3 would be preferably substantially the same construction as illustrated for the left-hand bearing in Fig. 7.

The drag plate P-1 has guide plates or members 22 welded or otherwise secured to each side thereof and such guide plates 22 are positioned in the guide-ways or channels 12b on each side of the housing section 12. Similarly, the drag plate P-2 has guide plates 23 formed, or welded or otherwise secured on the opposite sides thereof for guiding movement within the guide-ways or channels 12b on each side of the housing section 12. Such plates 22 and 23 of course prevent rotation of the drag plates P-1 and P-2 while permitting longitudinal movement thereof in the direction of the stub shaft S. The stub shaft S fits through a central opening in each of the plates P-1 and P-2 so that it rotates relative to such drag plates P-1 and P-2. Such central opening in the plate P-1 is indicated by the numeral 25 in Fig. 2 and plate P-2 has a similar opening (not shown).

As best seen in Fig. 7, each of the flanges or guide-plates 22 is formed with a central opening 22a through which a rod 27 extends. Each rod 27 has threads 27a thereon at the end thereof adjacent the guide plate 22. Lock nuts 28 are provided on each side of each of the flanges 22 for adjustably locking the end of each rod 27 to each flange 22. Also, it will be evident that by loosening the nuts 28, the position of the plate 22 with respect to the rods 27 can be adjusted and then the nuts 28 can again be threaded into contact with each plate 22 for locking each rod 27 to each plate 22. Each rod 27 extends through the bore of a sleeve 30 and is longitudinally movable relative thereto. Thus, there is a sleeve 30 on each side of the drag plate P-2 and each of such sleeves 30 extends through a central opening 23a in each guide plate 23. Each sleeve or tube 30 has external threads 30a formed thereon which receive locking nuts 31 for locking the tube or rod 30 in position with respect to each of the plates or flanges 23. The relative position of the plate P-1 with respect to the tubes or sleeves 30 can be adjusted by loosening the nuts 31 and then relocating the drag plate P-1 and then locking the nuts 31 back in engagement with each of the plates 23. It should be noted in Fig. 1 that the access openings 12e permit such adjustment of the positions of the plates 22 and 23 and the drag plates P-1 and P-2 therewith without requiring a disassembly of the structure. Of course, the cover plate 16 must be removed prior to the adjustments of such nuts 31 and 28 so as to expose the access openings 12e.

On each side of the housing H, a support bracket of substantially U shape is mounted (Figs. 1, 3, 7 and 8), such bracket having a substantially vertically extending section 35a, an upper section 35b, a lower section 35c, and a seal plate 35d. The seal plate 35d is welded or otherwise connected to the external surface of the housing H and it is provided with a central opening 35e therethrough for receiving the tube 30 and the rod 27 on each side of the housing H. A seal ring 36 such as an O-ring is mounted in the opening 35e for sealing contact with the external surface of the tube 30 in connection with each of the plates 35d.

Each rod 27 has a rack 37 welded or otherwise secured thereto with rack teeth 37a formed internally thereof. Also, each of the tubes or sleeves 30 has a rack 38 with the rack teeth 38a formed thereon. The racks 37 and 38 are engaged with a gear 39 which has teeth mating in engagement with the teeth 37a and 38a so that as the gear 39 is rotated, the racks 37 and 38 are moved longitudinally. Since the racks 37 are above the gears 39 and the racks 38 are below the gears 39, the rotation of the gears 39 imparts opposite longitudinal movement to the racks 37 and 38 simultaneously. During such longitudinal movement of the racks 37 and 38, bushing support members 40 and 41 support the racks 37 and 38, respectively, against wobbling or any appreciable shifting. Such bushings 40 and 41 are connected to the plates 35b and 35c, respectively, with any suitable securing means such as the screws 42 and 43, respectively.

Each of the gears 39 is keyed or otherwise suitably connected with an operating shaft 45 which extends through the vertical bracket section 35a. Each of the shafts 45 is connected with a rocker-arm 46 which in turn has a pivotal connection with connecting links 47 (Fig. 1). Each of the links 47 is pivotally connected to a rocker-arm 48 which in turn are connected with a connecting shaft 50 (Figs. 1 and 2).

For effecting a simultaneous movement of both of the gears 39 so as to move the drag plates P-1 and P-2 simultaneously either towards or away from each other, a common or single operating means is preferably provided such as the hydraulically or pneumatically actuated piston 52 (Fig. 1) which is mounted on one side of the housing H. The piston 52 fits within a conventional pneumatic or hydraulic cylinder 53 and suitable hydraulic or air admission and exhaust lines 54 and 55 are connected with the cylinder 53 so as to cause the piston 52 to move in either direction within the cylinder 53 as desired. The cylinder 53 is preferably pivotally connected at 53a to the lower portion of the housing H. The piston 52 has a piston rod 52a extending through the cylinder 53 and it joins with one of the pivotal connections 58 between the link 47 and the rocker-arm 48 on one side of the housing H. Therefore, as the piston 52 is moved within the cylinder 53, it imparts a movement to the link 47 and the rocker-arm 48 on the side thereof where such piston 52 and cylinder 53 are located. Since the rocker-arm 48 is connected to the connecting shaft 50 such movement is transmitted to the linkage on the other side of the housing H and of course the link 47 transmits its movement to the rocker-arm 46 and ultimately to the gear 39 on the side of the housing H where the piston 52 and cylinder 53 are located. Therefore, both of the gears 39 are operated by the operation of the piston 52. An air valve 60, or a hydraulic valve, either of which are of conventional construction is connected to the flow lines 54 and 55 extending to the cylinder 53 so as to control the admission and exhaust of the air or hydraulic fluid from the cylinder 53. The valve 60 is operated by an operating shaft 61 having a manual valve member 62 therewith to regulate the extent of the admission of the air or gas through the valve 60 manually if so desired. However, under ordinary circumstances, the manipulation of the valve 60 is accomplished automatically with a special actuating lever 63 which is formed with laterally extending contact portions 63a and 63b so that such lever 63 is substantially of an S shape. Such lever 63 is connected to the operating shaft 61 through a connecting member 64 so that movements of the lever 63 are transmitted to the valve 60 through the shaft or rod 61.

For effecting the automatic movement of the lever 63 for the automatic operation of the drag device of this invention, as will be more fully explained, the control mechanism or assembly C which is illustrated in Figs. 4, 5 and 6 in detail, is utilized. The control or actuating assembly C includes an internal gear ring 70 which has external gear teeth 70a formed thereon. An external gear ring 71 having internal gear teeth 71a formed thereon is positioned externally of the internal gear 70 and the inner diameter of the internal gear teeth 71a is sufficiently great as compared to the external diameter of the external gear teeth 70a so as to provide an annular space between the gears 70 and 71. A plurality of idler gears 72, preferably four in number and spaced approximately 90° from each other, are positioned between the gears 70 and 81 and have gear teeth 72a thereon in driving engagement with the gear teeth 70a and 71a. The internal gear 70 is keyed or otherwise connected to the stub shaft S for rotation therewith. A pair of external retaining plates 75 and 76 are positioned on the sides of the gears 70 and 71 to retain the gears 72 therebetween. The external diameter of such plates 75 and 76 is greater than the internal diameter of the ring 71, but the external diameter of each of the plates 75 and 76 is less than the external diameter of the ring 71, as best seen in Figs. 3, 4 and 6. The idler gears 72 71, are mounted between the plates 75 and 76 for movement therewith, but each gear 72 may rotate about its own axis independently of the movement of the plates 75 and 76 with the shaft S. Such movement of the idler gears 72 effects a relative movement between the gears 70 and 71 for a limited period of travel of the shaft S, as will be explained. The plates 75 and 76 are also keyed (one key between plate 75 and shaft 70 appearing in Fig. 4) or are otherwise suitably connected to the shaft S so that the internal gear 70 and the plates 75 and 76 rotate together with the shaft at all times.

An operating finger 77 is mounted on the plate 75 for pivotal movement about a pivot pin 77a on such plate 75. Such finger 77 extends outwardly from its pivot point 77a and it is confined between two pins 78 which are mounted on the external ring gear 71 so as to extend laterally therefrom to engage the sides of the finger 77 (Figs. 3-5). A pair of stops 79 and 80 are fixed to the plate 75, with the stop 79 serving to limit the movement of the finger 77 as the shaft S rotates in one direction so that such finger 77 extends in the solid line position of Fig. 4 to project beyond the periphery of the external gear 71. The other stop 80 is contacted by the finger 77 when it reaches its dotted line position of Fig. 4 wherein such finger 77 is in a retracted position with its outer end inside of the periphery of the gear 71.

To understand the operation or functioning of the control means C to move the finger 77 from its dotted line position to its solid line position in Fig. 4, assume that the stub shaft S is moving in a counterclockwise direction as viewed in Fig. 4 and as indicated by the arrow therein. In that case, the plate 75, the internal gear 70 and the other plate 76 are all revolving in the same counterclockwise direction. Since the ring 71 is not connected directly to the shaft S, it is not rotated in the same direction as the internal gear 70 and the plates 75 and 76. In fact, the rotation of the gear 70 in the counterclockwise direction effects a clockwise rotation of each of the internal idler gears 72 about their own axes of rotation as indicated in Fig. 4. Such clockwise rotation of the idler gears 72 causes the external ring gear 71 to move in a clockwise direction relative to gear 70 as also indicated by the arrow in Fig. 4. There is thus a relative rotation between the gear 70 and the gear 71 which causes the pins 78 to move relative to the stop 79. The movement of the pins 78 carries the outer end of the finger 77 from the dotted line position to the solid line position of Fig. 4 until it contacts the stop member 79 on the plate 75. When such contact occurs, further relative movement between the external ring 71 and the gear 70, and plates 75 and 76 is prevented so that the finger 77 then moves in a counterclockwise direction in its extended position beyond the periphery of the gear 71 (solid line position of Fig. 4). In that position, the portion of the finger 71 projecting beyond the gear 71 contacts the end or portion 63a of the operating lever 63 as the finger 77 moves in the counterclockwise direction (Fig. 4) so that the lever 63 is pivoted or turned in a clockwise direction as viewed in Fig. 4. The portion of the finger 77 which extends beyond the periphery of the ring gear 71 is sufficiently short so that when the lever 63 has been moved counterclockwise a sufficient distance to operate the valve 60, the finger 77 can then pass beyond and clear of the end or section 63a so that rotation of the finger 77 with the shaft S is never stopped or retarded. As will be explained more in detail, the finger 77 is used to actuate the lever 63 for moving the piston 52 upwardly as viewed in Fig. 1 for causing a clockwise movement of the rocker-arms 46 which results in a corresponding clockwise movement of the gears 39 to move the drag plates P-1 and P-2 towards each other to a maximum extent for dragging or braking purposes.

On the opposite side of the control assembly C, another finger 82 is pivotally connected to the retainer plate 76 (Fig. 6). The inner end of the actuating finger 82 is pivoted at a pivot pin 82a to the plate 76 while the outer end thereof is free to move outwardly or radially between pins 83 which are mounted on the gear 71. Stop members 84 and 85 are provided on the external surface of the plate 76 for limiting the extent of the pivotal movement of the finger 82 so that such finger 82 can move from the retracted position (solid lines of Fig. 4) to the extended position beyond the periphery of the ring gear 71 (dotted lines in Fig. 6) and back again from such dotted line extended position to the solid line retracted position. The finger 82 is retracted as shown in Fig. 6 when the finger 77 is extended as also shown in Fig. 6. However, when the finger 77 is retracted, then the finger 82 is extended so that only one of the fingers 77 and 82 is extended at any one time beyond the periphery of the ring gear 71. As pointed out above, the finger 77 is extended when the shaft S moves in a counterclockwise direction as viewed in Fig. 4 whereas the finger 82 would be extended when the shaft S is moved in a counterclockwise direction as viewed in Fig. 6 (or a clockwise direction as viewed in Fig. 4). The finger 82 contacts the leg or section 63b of the operating lever 63 as it moves downwardly when such finger 82 is in the extended position (dotted line position of Fig. 6). In other words, when the stub shaft S revolves in the clockwise direction as viewed in Fig. 6, (counterclockwise direction as viewed in Fig. 4), then the finger 77 throws the lever 63 by the contact of the finger 77 with the leg 63a of such lever 63. As the shaft S continues to rotate in the same direction, there is no further actuation of the lever 63. However, when the shaft S is reversed in its direction of rotation so that it is then rotating in a counterclockwise direction as viewed in Fig. 6 (clockwise direction as viewed in Fig. 4), then the finger 77 is retracted and the finger 82 is moved to its extended position so that the finger 82 then contacts the portion 63b of the lever 63 to reverse the position of the lever 63 as it passes same the first time. Thereafter, the lever 63 is unaffected as the shaft S is rotated until the shaft S is again reversed in its direction so that the previous actuation of the lever 63 with the finger 77 is again effected. Therefore, the control means or assembly C of this invention actually automatically operates the lever 63 upon a reversal in the direction of rotation of the shaft S and such manipulation of the lever 63 controls the air or hydraulic valve 60 to change the position of the piston 52 and of course such change in the position of the piston 52 affects the position of the gears 39 so as to change the position of the plates P-1 and P-2 with respect to the rotor R. Thus, when the gears 39 are moved in a counterclockwise direction the racks 37 and 38 are moved so as to move the plates P-1 and P-2 away from each other and away from the rotor R to a maximum extent for diminishing or completely eliminating any drag force on the rotor R as it rotates. Such counterclockwise rotation of the gears 39 (as viewed in Fig. 7) occurs when the piston 52 is moved from its upper position to a lower position by the actuation of the control valve 60, and as previously pointed out, such valve 60 is controlled to cause such movement of the piston 52 to its lower position when the finger 82 is in its extended position and the finger 77 is in its retracted position.

For obtaining the most desirable braking or dragging force with the rotor R and the drag plates P-1 and P-2 of this invention, such rotor R and the plates P-1 and P-2 are preferably formed with vanes which radiate outwardly from a central point at about the mid-point of the shaft S. The radial vanes 86 with the surface 86a formed thereon are shown in Fig. 2 and also in Fig. 7. Such vanes 86 may take numerous forms, but as illustrated, they are preferably radial and they preferably slope at an angle as illustrated in Fig. 7. It should be noted that the vanes 86 shown in Fig. 7 for the drag plate P-1 are shown in section as if just the outer skin or layer at the periphery of the drag plate P-1 had been removed. Similarly, the other drag plate P-2 is formed with vanes 87 having inner surfaces 87a formed thereon. Such vanes 87 are radial and take the same form in the preferred construction of this invention as the vanes 86 for the drag plate P-1. The rotor R is formed with a central rib 88 having vanes 89 and 90 extending therefrom. Such ribs 89 and 90 are also radially spaced from the center of the rotor R and are inclined so that the vanes 89 have substantially the same inclination as the vanes 86, whereby the spaces between the vanes 86 and the spaces between the vanes 89 are aligned for fluid communication therebetween successively as the rotor R rotates relative to the plate P-1. Likewise, the vanes 90 on the rotor R are aligned and are inclined at the same angle as the vanes 87 so that the spaces between the vanes 90 and the spaces between the vanes 87 are aligned successively as the rotor R rotates relative to the plate P-2. It will be noted that the vanes 86 and 87 are inclined at opposite angles and likewise the vanes 89 and 90 are inclined at opposite angles. Therefore, with such construction of the vanes, it can be seen that as the rotor R is rotated in a counterclockwise direction as viewed in Fig. 2 (or as viewed from the right-hand side of Fig. 7), the fluid within the rotor R will be forced from the spaces or pockets between the vanes 89 and 90 into the pockets or spaces between the vanes 86 and 87, respectively, which of course retards or resists movement of the rotor R because such fluid has no appreciable place to travel. When the rotor R is rotated in the opposite direction, that is, in a clockwise direction as viewed in Fig. 2 (or as viewed from the right-hand end of Fig. 7), the fluid in the rotor R is ejected therefrom into the areas between the vanes 86 and 87.

It should also be noted that each of the plates P-1 and P-2 has a plurality of inlet openings 95 (only those of plate P-1 are illustrated in Fig. 2) through which fluid is drawn or caused to flow as the rotor R is rotated. Thus, the general flow of the fluid or liquid which is in the housing H during the rotation of the rotor R is from the fluid reservoir 14 through the flow line 12c and then through the openings 95 in each of the drag plates P-1 and P-2. Such openings 95 are close to the stub shaft S because it will be appreciated that a centrifugal force is created as the rotor R is rotated and therefore a vacuum or reduced pressure is created near the center of the stub shaft S. For that reason, the fluid or liquid is drawn in through such openings 95 in each of the drag plates P-1 and P-2. The fluid is then confined between the rotor R and the drag plates P-1 and P-2 and due to the centrifugal action of the rotor R as it rotates there is a tendency for the fluid to be forced outwardly in a radial direction from the center of the stub shaft S. However, since the outer edges of the rotor R and the plates P-1 and P-2 are closed by the thin outer layer or skin, the fluid must all discharge between the plate P-1 and the rotor R and also between the plate P-2 and the rotor R. Therefore, the space between the plate P-1 and the rotor R and the space between the plate P-2 and the rotor R determine the exact extent of the resistance to the movement of the rotor R. It can therefore be appreciated that if the plates P-1 and P-2 are very close to the rotor R the difficulty in forcing such liquid outwardly between the rotor R and such plates P-1 and P-2 becomes so great that the rotation of the rotor R can actually be almost stopped if so desired. However, in a normal use of this invention for applying a dragging or braking force to a drum shaft, the rotation of the rotor R is never completely stopped but is simply retarded as desired until a constant dragging or braking force is applied to the stub shaft S and the drum shaft connected therewith. The maximum inward movement of the plates P-1 and P-2 with respect to the rotor R is effected when the rotation of the stub shaft S is in a counterclockwise direction as viewed in Fig. 2 so that the braking action effected with the vanes as previously explained is also accomplished. However, when the removal of the dragging force on the shaft S is desired, the plates P-1 and P-2 can be separated sufficiently so that substantially no impedance or restriction is provided between the plates P-1 and P-2 and the rotor R so that the rotor R can then move substantially unimpeded at the normal speed of the stub shaft S. Such position is desirable when the drum shaft is being used for the raising of well pipe as previously pointed out.

The operation or use of the apparatus of this invention is believed evident from the foregoing description. The flange 10 on the stub shaft S is ordinarily connected with a shaft from a drawworks drum in connection with an oil well rig, but it will be understood that such flange or connector 10 can be connected with any other type of shaft to which it is desired to apply a dragging or braking force to retard the rotation of such shaft in one direction while permitting free rotation of such shaft in the other direction. In any event, assuming the stub shaft S is connected with a shaft such as a drum shaft which is being rotated in a counterclockwise direction (as viewed in Fig. 2), in such case a dragging force is imparted to the stub shaft S and therefore to the shaft of the drum because the plates P-1 and P-2 are positioned substantially adjacent to the sides of the rotor R and the rotor R is moving in a direction so as to throw any fluid into the pockets of the plates P-1 and P-2, as previously explained. The finger 77 is in the extended position (solid line position of Fig. 4) and it is assumed that it had previously actuated the control lever 63 by contact with the portion 63a thereof so as to have previously actuated the piston 52 and cylinder 53 for locating the drag plates P-1 and P-2 in their maximum inward position with respect to each other and the rotor R for applying the maximum dragging or braking force to the stub shaft S without completely stopping the movement thereof. Such dragging or braking force is of course a constant force after the drag plates P-1 and P-2 have been moved inwardly towards each other to their maximum inward position, but during the time that such plates P-1 and P-2 are being moved towards each other towards their maximum inward position for applying the maximum dragging or braking force to the stub shaft S, a gradually increasing dragging force is being applied to the stub shaft S until the maximum constant dragging or braking force is ultimately applied when the plates P-1 and P-2 reach their inward maximum position. Such maximum inward dragging or braking force would of course be continuously applied until such time as the stub shaft S is reversed in its direction of rotation, and under normal circumstances, such would be the case. Thus, if well pipe is being lowered into a well with a cable from a drawworks, the unwinding of the cable from the drawworks is retarded with the constant braking or dragging force of the device of this invention until such time as the lowering of the well pipe is stopped. Therefore, controlled lowering of the well pipe in the well is obtained throughout the descent of such pipe and throughout the unwinding of the cable from the drum of the drawworks.

It should be noted that the dragging or braking force on the stub shaft S is obtained due to the fact that the liquid in the reservoir 14 is pumped continuously through the openings 95 (Fig. 2) in each of the drag plates P-1 and is forced outwardly in a radial direction by the centrifugal force of the rotor R as it is rotated by the shaft S. As the fluid is forced radially outwardly it is caused to pass between the annular spaces or areas between each of the plates P-1 and P-2 and the central rotor R. Thus, in effect, the spaces between the plates P-1 and P-2 and the rotor R are in effect annular orifices through which the fluid is caused to pass. Since the plates P-1 and P-2 are substantially adjacent to the rotor R, the annular orifices are obviously very narrow and therefore a large resistance to the flow of the fluid therebetween is obtained which causes the rotor R to be slowed down in its rotational movement and therefore the dragging or braking force is imparted to the stub shaft S. It should be noted also that as the fluid is caused to flow through the opening 12c from the reservoir 14 by the counterclockwise rotation of the stub shaft S (as viewed in Fig. 2), such fluid is discharged outwardly through the opening 12d and then passed through the flow pipe 15 back to the reservoir 14 so that a continuous circulation of the liquid is maintained as the dragging or braking force is being applied to the stub shaft S. Therefore, any heat which is generated in the liquid due to the resistance imparted as the liquid is forced between the plates P-1, P-2 and the rotor R is dissipated by the circulation of the liquid, and such circulation is maintained without the use of an auxiliary or additional pump, since the rotor R serves to pump fluid as it is rotated with the stub shaft S.

The stub shaft S may be reversed in its direction of rotation during the use thereof for many reasons, but in the normal use of the drag device of this invention, the stub shaft S is reversed when the drum shaft leading to the drawworks drum is reversed so as to wind up cable thereon for lifting well pipe from a well. Under such circumstances, it is important that substantially no drag or braking force is applied to the stub shaft S and therefore the stub shaft S must be free to rotate in a clockwise direction (as viewed in Fig. 2) in the example of this invention. When the stub shaft S is reversed in its direction of rotation, the control means C is operated to retract the finger 77 to its dotted line position of Fig. 4 and to extend the finger 82 from its retracted position to the extended position shown in dotted lines in Fig. 6. The finger 82 then contacts the lever section 63b to move the lever 63 to the right as viewed in Fig. 6 which is of course in an opposite direction to that position in which the lever 63 was located by the coaction with the finger 77. Such reversal in the movement of the lever 63 effects a change in the position of the valve 60 so as to operate the piston 52. The piston 52 is moved upwardly to cause the rocker-arms 46 on both sides of the housing H to move to the left as viewed in Fig. 1 so as to impart a clockwise movement to the gears 39. Such clockwise movement of the gears 39 causes the racks 37 to move to the right as viewed in Fig. 7 and causes the racks 38 to move to the left as viewed in Fig. 7. Such movement of the racks 37 and 38 effects a simultaneous movement of the plates P-1 and P-2 away from each other and away from the rotor R. It will also be appreciated that both sides of the plates P-1 and P-2 are moved at the same time so as to prevent any misalignment or shifting or wobbling of the plates P-1 and P-2 as they are moved away from each other. The plates P-1 and P-2 are moved a sufficient distance from the rotor R so that thereafter as the rotor R is rotated with the stub shaft S, substantially no resistance is encountered to such rotation because the spaces between the plates P-1 and P-2 and the rotor R are so great that there is free flow of the liquid permitted therethrough.

Circulation of the liquid is still maintained throughout the housing H, however, but instead of flowing from the reservoir 14 through the opening 12c, the liquid is flowing in the reverse direction and is admitted through the line 15 and opening 12*d* and is discharged into the reservoir 14 from the housing H through the opening 12*c*. Therefore, in both directions of rotation of the stub shaft S, there is a continuous circulation of the liquid in the brake or drag device of this invention. Such circulation is maintained without the use of any addtional pump since the rotor R maintains such circulation itself.

The movement of the plates P-1 and P-2 either in the direction towards or away from each other is a gradual movement and the annular area between the plate P-1 and the rotor R and the other annular area between the plate P-2 and the rotor R are gradually increased or decreased depending upon the direction of movement of the plates P-1 and P-2 with respect to the rotor R. Therefore, the resistance or impedance offered to the rotation of the rotor R is changed gradually regardless of the direction in which the plates P-1 and P-2 are moved until such time as a constant dragging force is obtained when the plates P-1 and P-2 are moved towards each other or until such time as there is substantially no dragging force when the plates P-1 and P-2 are moved away from each other. It is possible to have an intermediate position between the maximum points of substantially no dragging force and substantially constant maximum force by manipulating the hand control 62 with the valve 60. It is even possible to stop the rotation of the stub shaft S if so desired. In any event, it will be appreciated that the gradual change in the braking action is extremely beneficial since the shock load on the stub shaft S is reduced to a minimum and is in no event sufficient to shear the shaft or to otherwise damage same as is often the case when an intermediate clutch is utilized between the stub shaft S and the drawworks drum.

When the stub shaft S is again reversed in direction so as to be again moving in a counterclockwise direction as viewed in Fig. 2, it will be appreciated that the finger 77 will then be moved to its extended position as shown in Figs. 4 and 6 and the finger 82 will then be retracted as shown in Fig. 6 so as to again shift the lever 63. At such time, the valve 60 is actuated so that the piston 52 is moved downwardly toward its lower maximum position by which causes both of the rocker-arms 46 to move to the right as viewed in Fig. 1 so as to move the gears 39 in a counterclockwise direction as viewed in Fig. 7. Such counterclockwise movement of the gears 39 causes the racks 37 to move to the left as viewed in Fig. 7 and also causes the racks 38 to move to the right as viewed in Fig. 7 which simultaneously moves the plates P-1 and P-2 towards each other. The gradual increase in the braking action thus takes place as previously pointed out until the plates P-1 and P-2 have reached their maximum inward position at which time a constant dragging force is obtained on the stub shaft S.

From the foregoing description, it can be appreciated that the reversal in the directional rotation of the stub shaft S automatically changes the position of the drag plates P-1 and P-2 with respect to the rotor R and therefore automatically changes the dragging force on the stub shaft S depending upon the direction of rotation of the stub shaft S. The use of manual controls and the use of a clutch for connecting the drag device of this invention to the drawworks drum shaft or any similar shaft is therefore eliminated with this invention.

It should be understood that although the single piston 52 and cylinder 53 are preferred, two or more power cylinders or other means for actuating the control assembly C could be utilized. It is also believed evident that the shaft S may be rotated in a clockwise direction (Fig. 2) instead of in the counterclockwise direction during the application of the dragging or braking force to the shaft, in which case, the operation of the device will be reversed.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A drag device, including a rotor, a shaft connected with said rotor, means on said shaft for connecting same to a drum shaft or the like, a drag plate on each side of said rotor, means for imparting movement to the drag plates towards and away from each other and said rotor, means for preventing rotational movement of said drag plates as said rotor rotates relative thereto, means for directing a fluid outwardly from the areas between the rotor and the drag plates so that as the rotor rotates relative to the drag plates a fluid resistance to the movement of the rotor relative to the drag plates is created, said fluid resistance increasing as the drag plates are moved towards said rotor and decreasing as the drag plates are moved away from said rotor, and means operable upon a reversal in the direction of rotation of said shaft for operating the means for moving said drag plates so as to position the drag plates a sufficient distance from the rotor to substantially eliminate any drag force on the rotor and the shaft as said shaft is rotated in one direction and so as to position the drag plates sufficiently close to said rotor to create a predetermined fluid drag force on said rotor and said shaft in the other direction.

2. A drag device, including a housing, a rotor in said housing, a shaft connected with said rotor, means on said shaft for connecting same to a drum shaft or the like, a drag plate in said housing on each side of said rotor, each of said drag plates extending substantially parallel to said rotor with a space between each drag plate and said rotor, means for preventing rotational movement of said drag plates as said rotor rotates relative thereto, means for maintaining said drag plates substantially parallel to said rotor as they are moved towards and away from said rotor, means for discharging fluid outwardly from said space between the rotor and each of the drag plates so that as the rotor rotates relative to the drag plates a fluid resistance to the movement of the rotor relative to the drag plates is created, said fluid resistance increasing as the drag plates are moved axially towards said rotor and decreasing as the drag plates are moved axially away from said rotor, power means externally of said housing, means extending from said drag plates externally of said housing for mechanically connecting said power means to said drag plates for imparting movement to said drag plates to move same towards and away from each other and relative to said rotor, said means for imparting movement to the drag plates including an operating assembly on diametrically opposite sides of said drag plates, each operating assembly including a rod connected to one of said plates, a sleeve on said rod connected to the other of said plates, and means for simultaneously moving said rod and said sleeve of each operating assembly for simultaneously moving said drag plates towards or away from each other.

3. A drag device, including a housing, a rotor in said housing, a shaft connected with said rotor, means on said shaft for connecting same to a drum shaft or the like, a drag plate in said housing on each side of said rotor, each of said drag plates extending substantially parallel to said rotor with a space between each drag plate and said rotor, means for preventing rotational movement of said drag plates as said rotor rotates relative thereto, means for maintaining said drag plates substantially parallel to said rotor as they are moved towards and away from said rotor, means for discharging fluid outwardly from said space between the rotor and each of the drag plates so that as the rotor rotates relative to the drag plates a fluid resistance to the movement of the rotor relative to the drag plates is created, said fluid resistance increasing as the drag plates are moved axially towards said rotor and decreasing as the drag plates are moved axially away from said rotor, power means externally of said housing, means extending from said drag plates externally of said housing for mechanically connecting said power means to said drag plates for imparting movement to said drag plates to move same towards and away from each other and relative to said rotor, guide channels in said housing, and guide plates extending laterally from each of said drag plates and slidable in said guide channels for guiding the drag plates as they are moved towards and away from each other.

References Cited in the file of this patent

UNITED STATES PATENTS

| | | |
|---|---|---|
| 710,757 | Hitt et al. | Oct. 7, 1902 |
| 1,992,910 | La Mater | Feb. 26, 1935 |
| 1,992,912 | La Mater | Feb. 26, 1935 |
| 2,035,576 | Taylor | Mar. 31, 1936 |
| 2,170,128 | La Mater | Aug. 22, 1939 |
| 2,226,412 | Schmidt | Dec. 24, 1940 |
| 2,280,897 | Denman | Apr. 28, 1942 |
| 2,714,946 | Tenot et al. | Aug. 9, 1955 |
| 2,790,518 | Wilson | Apr. 30, 1957 |

FOREIGN PATENTS

| | | |
|---|---|---|
| 576,462 | France | May 14, 1921 |